(12) United States Patent
Chang

(10) Patent No.: US 9,236,755 B2
(45) Date of Patent: Jan. 12, 2016

(54) CHARGING SYSTEM FOR REDUCING HARMONIC WAVE AND FABRICATING COST

(75) Inventor: Yu-Ming Chang, Taoyuan Hsien (TW)

(73) Assignee: DELTA ELECTRONICS, INC., Taoyuan Hsien (TW)

(*) Notice: Subject to any disclaimer, the term of this patent is extended or adjusted under 35 U.S.C. 154(b) by 571 days.

(21) Appl. No.: 13/610,596

(22) Filed: Sep. 11, 2012

(65) Prior Publication Data

US 2013/0307486 A1    Nov. 21, 2013

(30) Foreign Application Priority Data

May 17, 2012   (TW) ............................. 101117510 A

(51) Int. Cl.
| | | |
|---|---|---|
| H02J 7/10 | (2006.01) | |
| H02J 7/02 | (2006.01) | |
| B60L 11/18 | (2006.01) | |
| H02M 1/00 | (2007.01) | |

(52) U.S. Cl.
CPC ............. *H02J 7/022* (2013.01); *B60L 11/1812* (2013.01); *B60L 11/1816* (2013.01); *B60L 11/1824* (2013.01); *B60L 2210/10* (2013.01); *B60L 2210/30* (2013.01); *B60L 2210/40* (2013.01); *B60L 2230/00* (2013.01); *B60L 2230/16* (2013.01); *B60L 2230/40* (2013.01); *H02M 2001/007* (2013.01)

(58) Field of Classification Search
CPC .. H02J 7/022; B60L 11/1812; B60L 11/1824; B60L 11/1816; B60L 2210/40; B60L 2230/16; B60L 2230/40; B60L 2230/00; B60L 2210/10; B60L 2210/30; H02M 2001/007
See application file for complete search history.

(56) References Cited

U.S. PATENT DOCUMENTS

| | | | | |
|---|---|---|---|---|
| 3,784,892 A | * | 1/1974 | Zelina ........................... | 320/132 |
| 4,152,640 A | * | 5/1979 | Craig ............................. | 324/546 |
| 5,214,385 A | * | 5/1993 | Gabriel et al. ................ | 324/434 |
| 5,499,178 A | * | 3/1996 | Mohan ........................... | 363/39 |
| 5,986,907 A | * | 11/1999 | Limpaecher .................... | 363/61 |
| 6,278,279 B1 | * | 8/2001 | Daun-Lindberg et al. .... | 324/427 |
| 6,552,514 B2 | * | 4/2003 | Yang ............................. | 320/125 |

(Continued)

FOREIGN PATENT DOCUMENTS

| | | |
|---|---|---|
| CN | 201303290 | 9/2009 |
| JP | 02-041663 | 2/1990 |

(Continued)

*Primary Examiner* — Naum B Levin
(74) *Attorney, Agent, or Firm* — Kirton McConkie; Evan R. Witt

(57) ABSTRACT

A charging system is provided for charging a chargeable battery. The charging system includes a phase-shifting transformer and a converting unit. The phase-shifting transformer includes a three-phase primary winding assembly and plural three-phase secondary winding assemblies. After a three-phase AC input voltage is received by the three-phase primary winding assembly, the three-phase AC input voltage is decreased, so that plural three-phase AC output voltages are outputted from respective three-phase secondary winding assemblies. The converting unit is electrically connected with the phase-shifting transformer, and includes plural three-phase rectifying circuits and a DC-DC converting circuit. The plural three-phase AC output voltages are rectified by the three-phase rectifying circuits, and the rectified voltage is converted into a DC charging voltage to charge the chargeable battery.

11 Claims, 8 Drawing Sheets

(56) References Cited

U.S. PATENT DOCUMENTS

| | | | | |
|---|---|---|---|---|
| 6,574,125 | B2* | 6/2003 | Matsukawa et al. | 363/71 |
| 6,650,557 | B2* | 11/2003 | Ferens et al. | 363/126 |
| 6,750,563 | B2* | 6/2004 | Rostron et al. | 307/103 |
| 6,950,322 | B2* | 9/2005 | Ferens | 363/44 |
| 6,954,366 | B2* | 10/2005 | Lai et al. | 363/71 |
| 7,135,836 | B2* | 11/2006 | Kutkut et al. | 320/116 |
| 7,375,996 | B2* | 5/2008 | Singh et al. | 363/149 |
| 7,852,605 | B2* | 12/2010 | Hill | 361/2 |
| 7,948,340 | B2* | 5/2011 | Rastogi et al. | 336/5 |
| 8,030,884 | B2* | 10/2011 | King et al. | 320/104 |
| 8,368,349 | B2* | 2/2013 | Zyren | 320/109 |
| 8,384,244 | B2* | 2/2013 | Peterson et al. | 307/66 |
| 8,412,387 | B2* | 4/2013 | Park et al. | 700/297 |
| 2002/0017893 | A1* | 2/2002 | Duff, Jr. | 320/100 |
| 2006/0017328 | A1* | 1/2006 | Bryde | 307/64 |
| 2008/0039979 | A1* | 2/2008 | Bridges et al. | 700/292 |
| 2010/0201338 | A1* | 8/2010 | Haj-Maharsi et al. | 323/305 |
| 2011/0266871 | A1* | 11/2011 | Thisted | 307/46 |
| 2012/0181973 | A1* | 7/2012 | Lyden | 320/101 |
| 2012/0211319 | A1* | 8/2012 | Jacobi et al. | 191/12.2 R |
| 2013/0020989 | A1* | 1/2013 | Xia et al. | 320/109 |
| 2013/0140903 | A1* | 6/2013 | Divan et al. | 307/82 |
| 2013/0154365 | A1* | 6/2013 | Sarti | 307/23 |

FOREIGN PATENT DOCUMENTS

| | | |
|---|---|---|
| JP | 200867433 | 3/2008 |
| TW | 200945014 | 11/2009 |
| TW | 200950248 | 12/2009 |
| TW | 201119203 | 6/2011 |

\* cited by examiner

CHARGING SYSTEM FOR REDUCING HARMONIC WAVE AND FABRICATING COST

FIELD OF THE INVENTION

The present invention relates to a charging system, and more particularly to a charging system for charging a chargeable battery while reducing harmonic wave and fabricating cost.

BACKGROUND OF THE INVENTION

Gasoline-powered vehicles are widely used for transportation and become indispensible to our daily lives. With rapid development of the related technologies, mass production of gasoline-powered vehicles brings convenience to the human beings. The total number of gasoline-powered vehicles in the world is about 850 millions at present. In addition, 57% of the world's oil consumption (or 67% of the United State's oil consumption) lies in the transportation sector. It is estimated that the total number of gasoline-powered vehicles in the world is about 1.2 billion in 2020. Since there is a net gap between the global oil demand and the oil supply, the unbalance between supply and demand of petroleum energy has become increasingly prominent. It is estimated that the net gap between the global oil demand and the oil supply is nearly twice the world's oil production quantity. Consequently, the oil price is rapidly increased, and the operating cost of the vehicle becomes higher and higher. Nowadays, many countries are actively encouraging the development of new energy vehicles in order to reduce the dependence on oil.

Furthermore, during operations of the gasoline-powered vehicles, the burning of the gasoline may cause air pollution problem and serious environmental problem. For protecting the environment, the manufacturers of vehicles are devoted to the development and research of low pollution vehicles. Among various kinds of new energy vehicles, electric vehicles (EV) are more advantageous because of the well-established technologies. In addition, since the power net is widespread over the world, it is convenient to acquire the stable electric energy. As a consequence, electric vehicles (EV) and hybrid electric vehicles (PHEV) are more important in the development of new energy vehicles.

As known, an electric vehicle or a hybrid electric vehicle has a built-in chargeable battery as a stable energy source. Moreover, a charging station and a charging circuit of the electric vehicle are collaboratively defined as a charging system. The charging system is used for charging the chargeable battery in order to provide electric energy required to power the electric vehicle. Generally, the charging station has an internal power-supplying circuit for receiving an AC input voltage and regulating the voltage level, thereby issuing an AC output voltage to the charging circuit. Nowadays, for generating high output power and achieving power-saving efficacy, the AC input voltage usually has a medium-high voltage level (e.g. 1.2 KV~22 KV). In addition, the charging station has an isolated transformer. By the isolated transformer, the AC input voltage is reduced to the AC output voltage of 200V~480V.

FIG. 1 schematically illustrates the architecture of a conventional charging system. As shown in FIG. 1, the conventional charging system 1 comprises an isolation unit 10 and a converting unit 11. The isolation unit 10 comprises a three-phase transformer Tr. Moreover, the isolation unit 10 is included in a charging station (not shown). The three-phase transformer Tr is used for receiving a three-phase AC input voltage $V_{in}$ (e.g. a medium-high voltage level in the range between 1.2 KV and 22 KV) from a power-supplying terminal (e.g. a utility power source), and reducing and converting the three-phase AC input voltage $V_{in}$ into a three-phase AC output voltage $V_{out}$ (e.g. 200V~480V). The converting unit 11 may be included in the charging station. For example, the converting unit 11 has a two-stage circuitry configuration. The converting unit 11 comprises a three-phase power factor correction circuit 110 (i.e. a first-stage circuit) and a DC-DC converting circuit 111 (i.e. a second-stage circuit). The three-phase power factor correction circuit 110 is electrically connected with the isolation unit 10 for filtering off the harmonic wave component contained in the received current, thereby increasing the power factor. Consequently, the three-phase power factor correction circuit 110 outputs a DC transition voltage $V_s$. The DC-DC converting circuit 111 is used for converting the DC transition voltage $V_s$ into a DC charging voltage $V_c$ for charging the chargeable battery in the electric vehicle in the range between 50V and 750V.

FIG. 2 schematically illustrates the architecture of another conventional charging system. Component parts and elements of FIG. 2 corresponding to those of FIG. 1 are designated by identical numeral references, and detailed description thereof is omitted. In comparison with FIG. 1, the first-stage circuit of the converting unit 21 of FIG. 2 comprises three sets of single-phase power factor correction circuits 210. Corresponding to the first-stage circuit, the second-stage circuit of the converting unit 21 of FIG. 2 comprises three sets of DC-DC converting circuits 211. Each single-phase power factor correction circuit 210 is electrically connected to two different phases of the output side of the isolated transformer Tr. Moreover, the three sets of DC-DC converting circuits 211 are electrically connected with corresponding single-phase power factor correction circuits 210, respectively. Moreover, the output terminals of these DC-DC converting circuits 211 are connected with each other in parallel. In such way, the three-phase balance of the input current is achieved, and the chargeable battery is charged by the DC charging voltage $V_c$.

Please refer to FIGS. 1 and 2 again. Since the three-phase transformer Tr is only configured to provide an isolating function but unable to filter off the harmonic wave, the three-phase power factor correction circuit 110 of the charging system 1 and the single-phase power factor correction circuits 210 of the charging system 2 are necessary to filter off the harmonic wave, thereby increasing the power factor. Since the circuitry configuration of the three-phase power factor correction circuit 110 or the single-phase power factor correction circuit 210 is very complicated and the number of the electronic components thereof is very large, the charging system 1 or 2 is high. Moreover, since the conventional charging system 1 or 2 has the two-stage circuitry configuration, the real working efficiency is influenced by the conversion loss of the DC-DC converting circuit 111 or 211 and the conversion loss of the three-phase power factor correction circuit 110 or the single-phase power factor correction circuit 210. Consequently, if the three-phase AC input voltage $V_{in}$ is in the range between 1.2 KV and 22 KV, the conversion efficiency of the conventional charging system 1 or 2 may reach only 89%~93%.

In FIGS. 1 and 2, the conventional charging system 1 or 2 is applied to the electric vehicle. Nevertheless, the conventional charging system 1 or 2 may be applied to other fields. For example, the conventional charging system 1 or 2 may be applied to an internet data center with at least one sever in order to charge a chargeable battery of server. However, the conventional charging system 1 or 2 applied to the internet data center also has the above problems.

Therefore, there is a need of providing an improved charging system in order to reduce the fabricating cost and enhancing the conversion efficiency.

SUMMARY OF THE INVENTION

The present invention provides a charging system for charging a chargeable battery. Since no power factor correction circuit is included in the charging system of the present invention, the harmonic wave number and the harmonic wave component are reduced, and the power factor is increased. In such way, the charging system of the present invention has reduced fabricating cost and enhanced conversion efficiency.

In accordance with an aspect of the present invention, there is provided a charging system for charging a chargeable battery. The charging system includes a phase-shifting transformer and a converting unit. The phase-shifting transformer includes a three-phase primary winding assembly and plural three-phase secondary winding assemblies. After a three-phase AC input voltage is received by the three-phase primary winding assembly, the three-phase AC input voltage is decreased, so that plural three-phase AC output voltages are outputted from respective three-phase secondary winding assemblies. Moreover, there is a phase-shifting angle between any two of the plural three-phase AC output voltages. The converting unit is electrically connected with the phase-shifting transformer, and includes plural three-phase rectifying circuits and a DC-DC converting circuit. The plural three-phase AC output voltages are rectified by the three-phase rectifying circuits, and the rectified voltage is converted into a DC charging voltage to charge the chargeable battery.

In accordance with another aspect of the present invention, there is provided a charging system for charging a chargeable battery. The charging system includes two phase-shifting transformers and two converting units. Each of the phase-shifting transformers includes a three-phase primary winding assembly and plural three-phase secondary winding assemblies. After a three-phase AC input voltage is received by the three-phase primary winding assembly, the three-phase AC input voltage is decreased, so that plural three-phase AC output voltages are outputted from respective three-phase secondary winding assemblies. Moreover, there is a phase-shifting angle between any two of the plural three-phase AC output voltages. The two converting units are electrically connected with the two phase-shifting transformers, respectively. Each of the converting units includes plural three-phase rectifying circuits and a DC-DC converting circuit. The plural three-phase AC output voltages are rectified by the three-phase rectifying circuits, and the rectified voltage is converted into a DC charging voltage, so that the chargeable battery is charged by the DC charging voltage from one of the two converting units.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
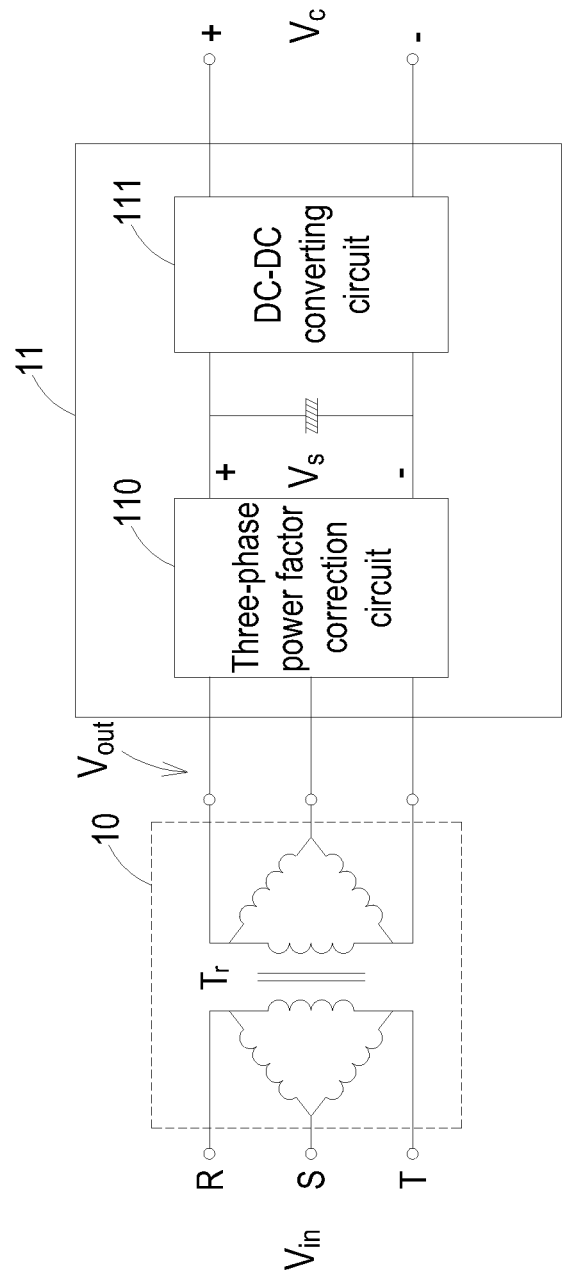
FIG. 1 schematically illustrates the architecture of a conventional charging system.
Figure 2:
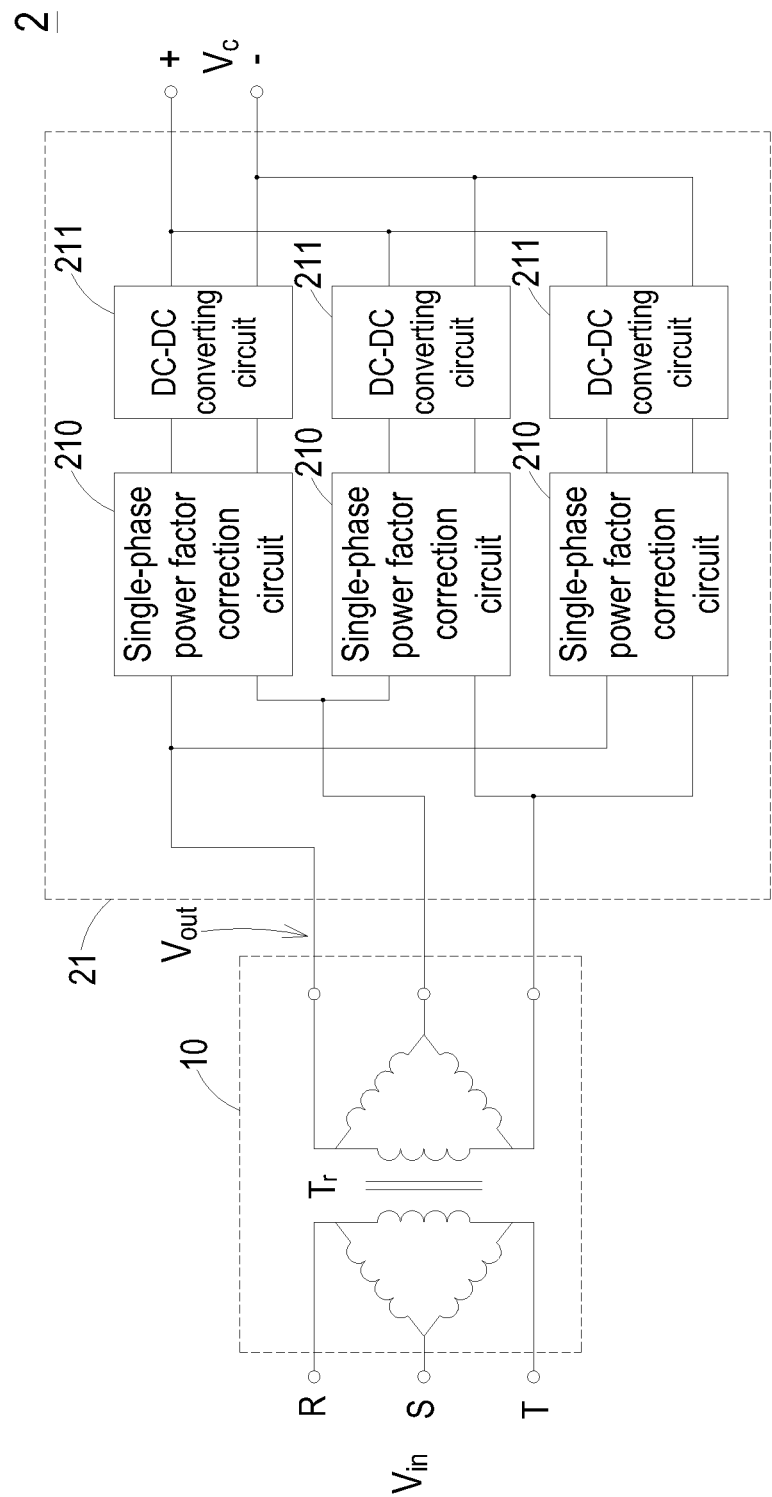
FIG. 2 schematically illustrates the architecture of another conventional charging system.
Figure 3:
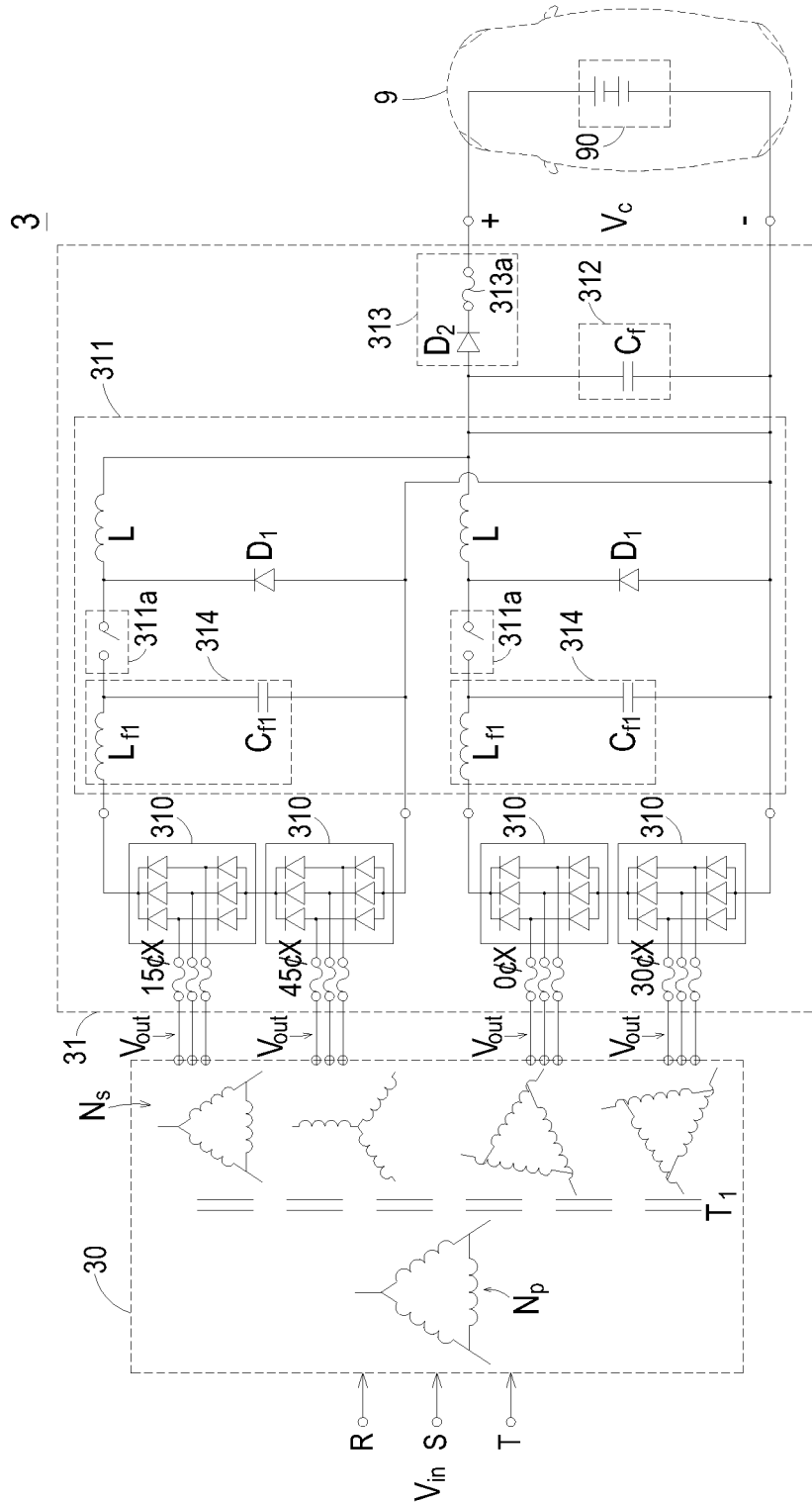
FIG. 3 schematically illustrates the architecture of another conventional charging system according to an embodiment of the present invention.

FIG. 3 schematically illustrates the architecture of another conventional charging system according to an embodiment of the present invention. As shown in FIG. 3, the charging system 3 is used for converting a three-phase AC input voltage $V_{in}$ into a DC charging voltage $V_c$ for charging the chargeable battery 90. In this embodiment, the chargeable battery 90 is disposed within an electric vehicle 9 for providing energy required to power the electric vehicle 9. The three-phase AC input voltage $V_{in}$ is in the range between 1.2 KV and 22 KV and received from a power-supplying terminal (e.g. a utility power source). The DC charging voltage $V_c$ for charging the chargeable battery 90 is in the electric vehicle 9 in the range between 50V and 750V. As shown in FIG. 3, the charging system 3 comprises an isolation unit 30 and a converting unit 31.

In this embodiment, the isolation unit 30 has an isolating function. The isolation unit 30 is included in a charging station, and comprises a phase-shifting transformer $T_1$. The phase-shifting transformer $T_1$ comprises a three-phase primary winding assembly $N_p$ and plural three-phase secondary winding assemblies $N_s$. As shown in FIG. 3, the phase-shifting transformer $T_1$ comprises a three-phase primary winding assembly $N_p$ and four three-phase secondary winding assemblies $N_s$. The three ends of the three-phase primary winding assembly $N_p$ are arranged in a delta (or Δ) connection configuration for receiving the three-phase AC input voltage $V_{in}$.

Due to electromagnetic induction of the plural three-phase secondary winding assemblies $N_s$, the three-phase AC input voltage $V_{in}$ received by the three-phase primary winding assembly $N_p$ is decreased into plural three-phase AC output voltages $V_{out}$, respectively. There is a phase-shifting angle between any two three-phase AC output voltages $V_{out}$. That is, the phase of each three-phase AC output voltage $V_{out}$ leads or lags the voltage of the three-phase primary winding assembly $N_p$ by an angle. As shown in FIG. 3, the phases of the four three-phase AC output voltages $V_{out}$ leads or lags the voltage of the three-phase primary winding assembly $N_p$ by 15 degrees, 45 degrees, 0 degree and 30 degrees, respectively.

In this embodiment, the three ends of each three-phase secondary winding assembly $N_s$ may be arranged in a Y connection configuration, a delta connection configuration or an extended delta connection configuration. As shown in FIG. 3, the phases of the four three-phase AC output voltages $V_{out}$ are arranged in a delta connection configuration, a Y connection configuration, an extended delta connection configuration and another extended delta connection configuration, respectively. In such way, each three-phase secondary winding assembly $N_s$ has at least one tapped winding structure. Moreover, the phase-shifting transformer $T_1$ is a 12-pulse phase-shifting transformer. Moreover, the phase-shifting transformer $T_1$ should comply with the medium-high voltage wiring safety regulations for receiving the medium-high three-phase AC input voltage $V_{in}$.

The total number of the three-phase secondary winding assemblies $N_s$, the winding ways of the three-phase secondary winding assemblies $N_s$ and the phase-shifting angle between any two three-phase AC output voltages $V_{out}$ are presented herein for purpose of illustration and description only. According to the practical requirements of filtering the harmonic waves, the total number of the three-phase secondary winding assemblies $N_s$, the winding ways of the three-phase secondary winding assemblies $N_s$ and the phase-shifting angle may be varied. For example, the phase-shifting angle may be changed by adjusting the winding size and turn number of each three-phase secondary winding assembly $N_s$. Under this circumstance, the phase-shifting transformer $T_1$ is a higher-pulse phase-shifting transformer such as a 24-pulse phase-shifting transformer.

In an embodiment, the converting unit 31 is included in a charging station. Alternatively, in some other embodiments, the converting unit 31 is not included in a charging station. In addition, the converting unit 31 is electrically connected between the plural three-phase secondary winding assemblies $N_s$ of the phase-shifting transformer $T_1$ and the chargeable battery 90 is in the electric vehicle 9. By the converting unit 31, the plural three-phase AC output voltages $V_{out}$ from the plural three-phase secondary winding assemblies $N_s$ are converted into the DC charging voltage $V_c$ with the rated voltage value for charging the chargeable battery 90.

The converting unit 31 comprises plural three-phase rectifying circuits 310 and a DC-DC converting circuit 311. The plural three-phase rectifying circuits 310 are electrically connected with the plural three-phase secondary winding assemblies $N_s$, respectively. By the plural three-phase rectifying circuits 310, the plural three-phase AC output voltages $V_{out}$ from the plural three-phase secondary winding assemblies $N_s$ are rectified.

In this embodiment, the number of the plural three-phase rectifying circuits 310 is equal to the number of the plural three-phase secondary winding assemblies $N_s$ of the phase-shifting transformer $T_1$. As shown in FIG. 3, corresponding to the four three-phase secondary winding assemblies $N_s$ of the phase-shifting transformer $T_1$, the converting unit 31 has four three-phase rectifying circuits 310. Optionally, every two three-phase rectifying circuits 310 may be connected with each other in series.

The DC-DC converting circuit 311 is electrically connected with the plural three-phase rectifying circuits 310. By the DC-DC converting circuit 311, the DC electric energy from the plural three-phase rectifying circuits 310 is converted into the DC charging voltage $V_c$ in three-phase balance. Consequently, the chargeable battery 90 is charged by the DC charging voltage $V_c$.

The DC-DC converting circuit 311 may be a multi-phase DC-DC converting circuit. For example, as shown in FIG. 3, the DC-DC converting circuit 311 is a multi-phase DC-DC converting circuit comprising a first-phase DC-DC converting circuit and a second-phase DC-DC converting circuit, which are connected with each other in parallel. Each of the first-phase DC-DC converting circuit and the second-phase DC-DC converting circuit is electrically connected with two serially-connected three-phase rectifying circuits 310. In addition, each of the first-phase DC-DC converting circuit and the second-phase DC-DC converting circuit has a non-isolated buck-type circuitry configuration. Each of the first-phase DC-DC converting circuit and the second-phase DC-DC converting circuit comprises a switching circuit 311a, a diode $D_1$, and an inductor L. The switching circuit 311a is electrically connected between the corresponding three-phase rectifying circuit 310 and the inductor L. The cathode of the diode $D_1$ is electrically connected to the switching circuit 311a and the inductor L. The anode of the diode $D_1$ is electrically connected to a negative output terminal of the DC-DC converting circuit 311. The inductor L is electrically connected between the switching circuit 311a and a positive output terminal of the DC-DC converting circuit 311.

In this embodiment, the converting unit 31 further comprises an output filtering circuit 312 and a protecting circuit 313. The output filtering circuit 312 is electrically connected with an output terminal of the DC-DC converting circuit 311 for filtering the DC charging voltage $V_c$. An example of the output filtering circuit 312 includes but is not limited to an output filtering capacitor $C_f$. The protecting circuit 313 is also electrically connected with the output terminal of the DC-DC converting circuit 311. During the chargeable battery 90 is charged by the charging system 3, the protecting circuit 313 can prevent the voltage of the chargeable battery 90 from being returned back to the charging system 3, thereby protecting the charging system 3. In this embodiment, the protecting circuit 313 comprises a diode $D_2$ and a fuse 313a, which are connected with each other in series.

In some embodiments, each of the first-phase DC-DC converting circuit and the second-phase DC-DC converting circuit of the DC-DC converting circuit 311 further comprises an input filtering circuit 314. The input filtering circuit 314 is electrically connected between the output terminal of a corresponding three-phase rectifying circuit 310 and the switching circuit 311a. For example, the input filtering circuit 314 comprises an input filtering inductor $Lf_1$ and an input filtering capacitor $Cf_1$. The input filtering circuit 314 is configured for filtering off the electromagnetic interference (EMI).

Figure 4:
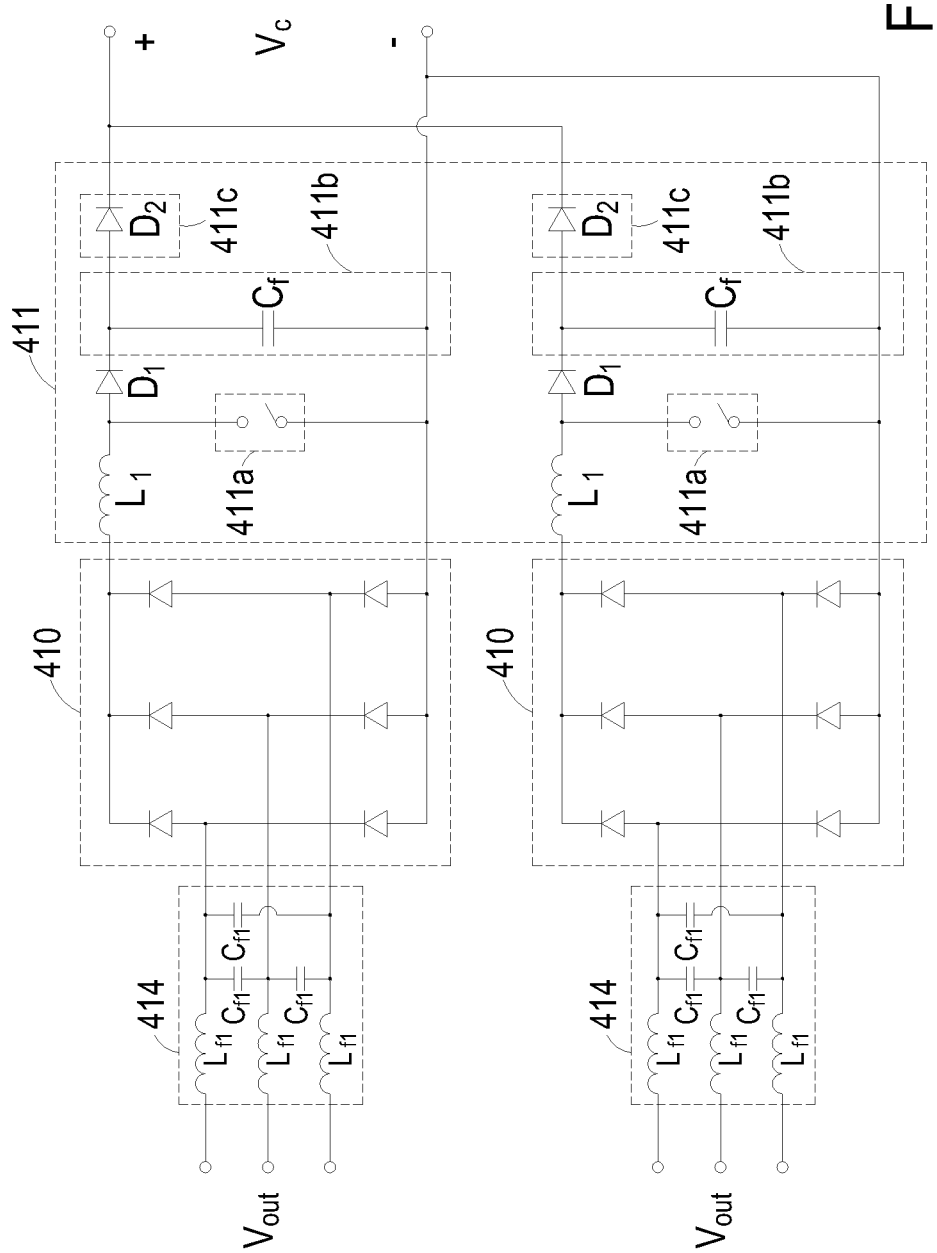
FIG. 4 schematically illustrates a variant example of the converting unit of the charging system as shown in FIG. 3.

The locations and components of the input filtering circuit 314 are presented herein for purpose of illustration and description only. In some embodiments, as shown in FIG. 4, the converting unit 41 may further comprise plural input filtering circuits 414. The plural input filtering circuits 414 are connected with plural single-phase input ends of the converting unit 41. Each of the input filtering circuits 414 comprises plural input filtering inductors $Lf_1$ and plural input filtering capacitors $Cf_1$. The plural input filtering inductors $Lf_1$ are connected with corresponding single-phase input ends of the converting unit 41, respectively. Each of the input filtering capacitors $Cf_1$ is connected between two corresponding single-phase input ends of the converting unit 41.

From the above discussions, the isolation unit 30 of the charging unit 3 comprises the phase-shifting transformer $T_1$. By the phase-shifting transformer $T_1$, the three-phase AC input voltage $V_{in}$ is converted into plural three-phase AC output voltages $V_{out}$, wherein there is a phase-shifting angle between any two three-phase AC output voltages $V_{out}$. That is, the power factor correction circuit included in the conventional charging system is exempted from the charging system 3 of the present invention. Consequently, the fabricating cost of the charging system 3 is reduced, and the conversion loss of the factor correction circuit is avoided. Assuming that the three-phase AC input voltage $V_{in}$ is in the range between 1.2 KV and 22 KV, the conversion efficiency of the charging system 3 may reach 96% or higher.

Hereinafter, some variant examples of the converting unit of the charging system as shown in FIG. 3 will be illustrated with reference to FIGS. 4, 5 and 6. For clarification and brevity, the converting unit has two input terminals electrically connected with two three-phase secondary winding assemblies, and the phase-shifting transformer is not shown in the drawings.

FIG. 4 schematically illustrates a variant example of the converting unit of the charging system as shown in FIG. 3. As shown in FIG. 4, the converting unit 41 comprises plural three-phase rectifying circuits 410 and a DC-DC converting circuit 411. The plural three-phase rectifying circuits 410 are electrically connected with the plural three-phase secondary winding assemblies $N_s$, respectively (see FIG. 3). By the plural three-phase rectifying circuits 410, the plural three-phase AC output voltages $V_{out}$ from the plural three-phase secondary winding assemblies $N_s$ are rectified. The structures and functions of the three-phase rectifying circuits 410 are similar to those of the three-phase rectifying circuits 310 of FIG. 3, and are not redundantly described herein.

The DC-DC converting circuit 411 may be a single-phase or multi-phase DC-DC converting circuit. As shown in FIG. 4, the DC-DC converting circuit 411 is a multi-phase DC-DC converting circuit comprising a first-phase DC-DC converting circuit and a second-phase DC-DC converting circuit, which have similar structures and are connected with each other in parallel. Each of the first-phase DC-DC converting circuit and the second-phase DC-DC converting circuit is electrically connected a corresponding three-phase rectifying circuit 410. In addition, each of the first-phase DC-DC converting circuit and the second-phase DC-DC converting circuit has a non-isolated boost-type circuitry configuration. Each of the first-phase DC-DC converting circuit and the second-phase DC-DC converting circuit comprises a first inductor $L_1$, a switching circuit 411a, and a diode $D_1$. The first inductor $L_1$ is electrically connected between the output terminal of the three-phase rectifying circuit 410 and the anode of the diode $D_1$. A first end of the switching circuit 411a is electrically connected to the first inductor $L_1$ and the anode of the diode $D_1$. A second end of the switching circuit 411a is electrically connected with the negative output terminal of the DC-DC converting circuit 411. The cathode of the diode $D_1$ is electrically connected with the positive output terminal of the DC-DC converting circuit 411.

In this embodiment, each of the first-phase DC-DC converting circuit and the second-phase DC-DC converting circuit further comprises an output filtering circuit 411b and a protecting circuit 411c. The output filtering circuit 411b comprises an output filtering capacitor $C_f$ for filtering the DC charging voltage $V_c$. Moreover, the protecting circuit 411c comprises a diode $D_2$. During the chargeable battery (not shown) is charged by the charging system, the protecting circuit 411c can prevent the voltage of the chargeable battery from being returned back to the charging system, thereby protecting the charging system. As previously described in FIG. 3, the output filtering circuit 312 and the protecting circuit 313 of the converting unit 31 are not included in the first-phase DC-DC converting circuit and the second-phase DC-DC converting circuit. Whereas, as shown in FIG. 4, the output filtering circuit 411b and the protecting circuit 411c are included in each of the first-phase DC-DC converting circuit and the second-phase DC-DC converting circuit.

Figure 5:
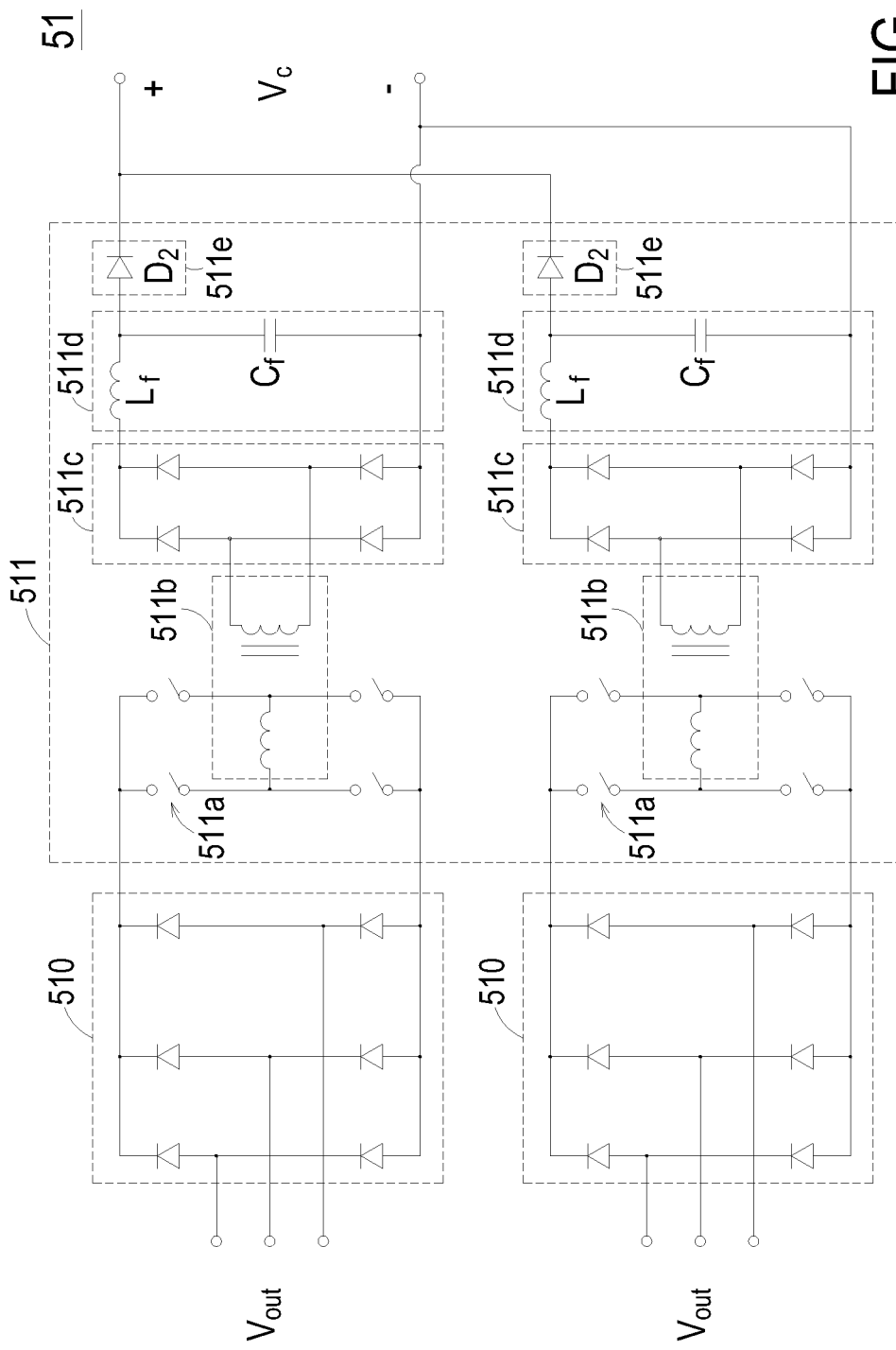
FIG. 5 schematically illustrates another variant example of the converting unit of the charging system as shown in FIG. 3.

FIG. 5 schematically illustrates another variant example of the converting unit of the charging system as shown in FIG. 3. As shown in FIG. 5, the converting unit 51 comprises plural three-phase rectifying circuits 510 and a DC-DC converting circuit 511. The plural three-phase rectifying circuits 510 are electrically connected with the plural three-phase secondary winding assemblies $N_s$, respectively (see FIG. 3). By the plural three-phase rectifying circuits 510, the plural three-phase AC output voltages $V_{out}$ from the plural three-phase secondary winding assemblies $N_s$ are rectified. The structures and functions of the three-phase rectifying circuits 510 are similar to those of the three-phase rectifying circuits 310 of FIG. 3, and are not redundantly described herein.

As shown in FIG. 5, the DC-DC converting circuit 511 is a multi-phase DC-DC converting circuit comprising a first-phase DC-DC converting circuit and a second-phase DC-DC converting circuit, which have similar structures and are connected with each other in parallel. Each of the first-phase DC-DC converting circuit and the second-phase DC-DC converting circuit is electrically connected a corresponding three-phase rectifying circuit 510. In addition, each of the first-phase DC-DC converting circuit and the second-phase DC-DC converting circuit has an isolated full-bridge circuitry configuration. Each of the first-phase DC-DC converting circuit and the second-phase DC-DC converting circuit comprises a full-bridge switching circuit 511a, a transformer 511b, and an output rectifying circuit 511c. The full-bridge switching circuit 511a is electrically connected with the output terminal of the three-phase rectifying circuit 510 and electrically connected with the primary side of the transformer 511b. When the full-bridge switching circuit 511a is alternately switched on and switched off, the electric energy is converted by the transformer 511b. The output rectifying circuit 511c is electrically connected with the secondary side of the transformer 511b. By the output rectifying circuit 511c, the electric energy outputted from the secondary side of the transformer 511b is rectified into the DC charging voltage $V_c$.

In this embodiment, each of the first-phase DC-DC converting circuit and the second-phase DC-DC converting circuit further comprises an output filtering circuit 511d and a protecting circuit 511e. The output filtering circuit 511d comprises an output filtering capacitor $C_f$ and an output filtering inductor $L_f$. Moreover, the protecting circuit 511e comprises a diode $D_2$. The functions of the output filtering circuit 511d and the protecting circuit 511e are similar to those of the output filtering circuit 411b and the protecting circuit 411c of FIG. 4, and are not redundantly described herein.

Figure 6:
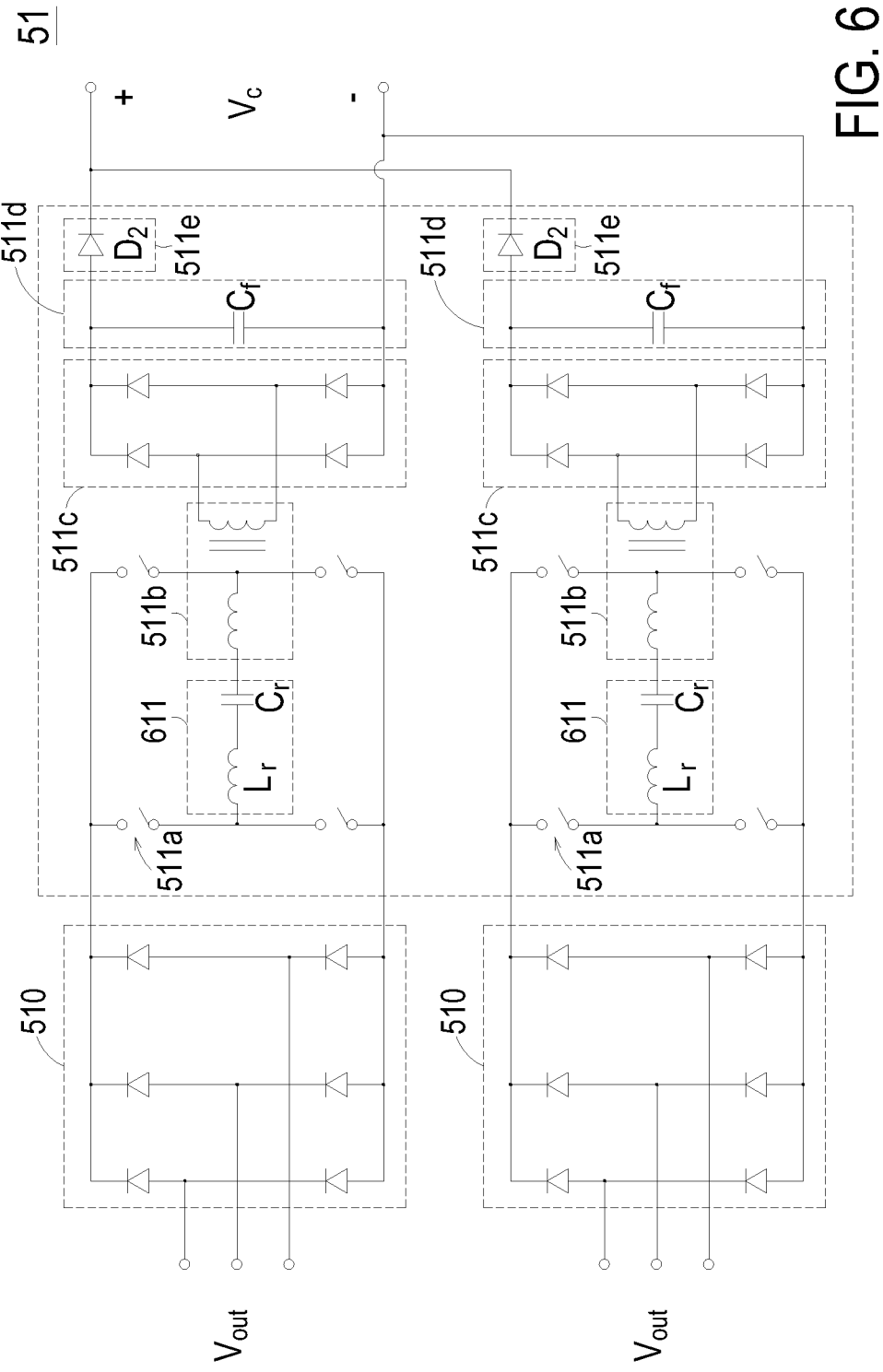
FIG. 6 schematically illustrates a further variant example of the converting unit of the charging system as shown in FIG. 3.

FIG. 6 schematically illustrates a further variant example of the converting unit of the charging system as shown in FIG. 3. As shown in FIG. 6, the converting unit 61 comprises plural three-phase rectifying circuits 510 and a DC-DC converting circuit 511. The DC-DC converting circuit 511 is a multi-phase DC-DC converting circuit comprising a first-phase DC-DC converting circuit and a second-phase DC-DC converting circuit, which have similar structures and are connected with each other in parallel. In this embodiment, each of the first-phase DC-DC converting circuit and the second-phase DC-DC converting circuit further comprises a resonant circuit 611. The resonant circuit 611 is electrically connected with the primary side of the transformer 511b. Moreover, the resonant circuit 611 comprises a resonant capacitor $C_r$ and a resonant inductor $L_r$. Due to the resonant circuit 611, each of the first-phase DC-DC converting circuit and the second-phase DC-DC converting circuit has an isolated resonant circuitry configuration.

As previously described in FIG. 5, the output filtering circuit 511d comprises the output filtering capacitor $C_f$ and the output filtering inductor $L_f$. Whereas, as shown in FIG. 6, the output filtering circuit 511d only comprises the output filtering capacitor $C_f$.

Figure 7:
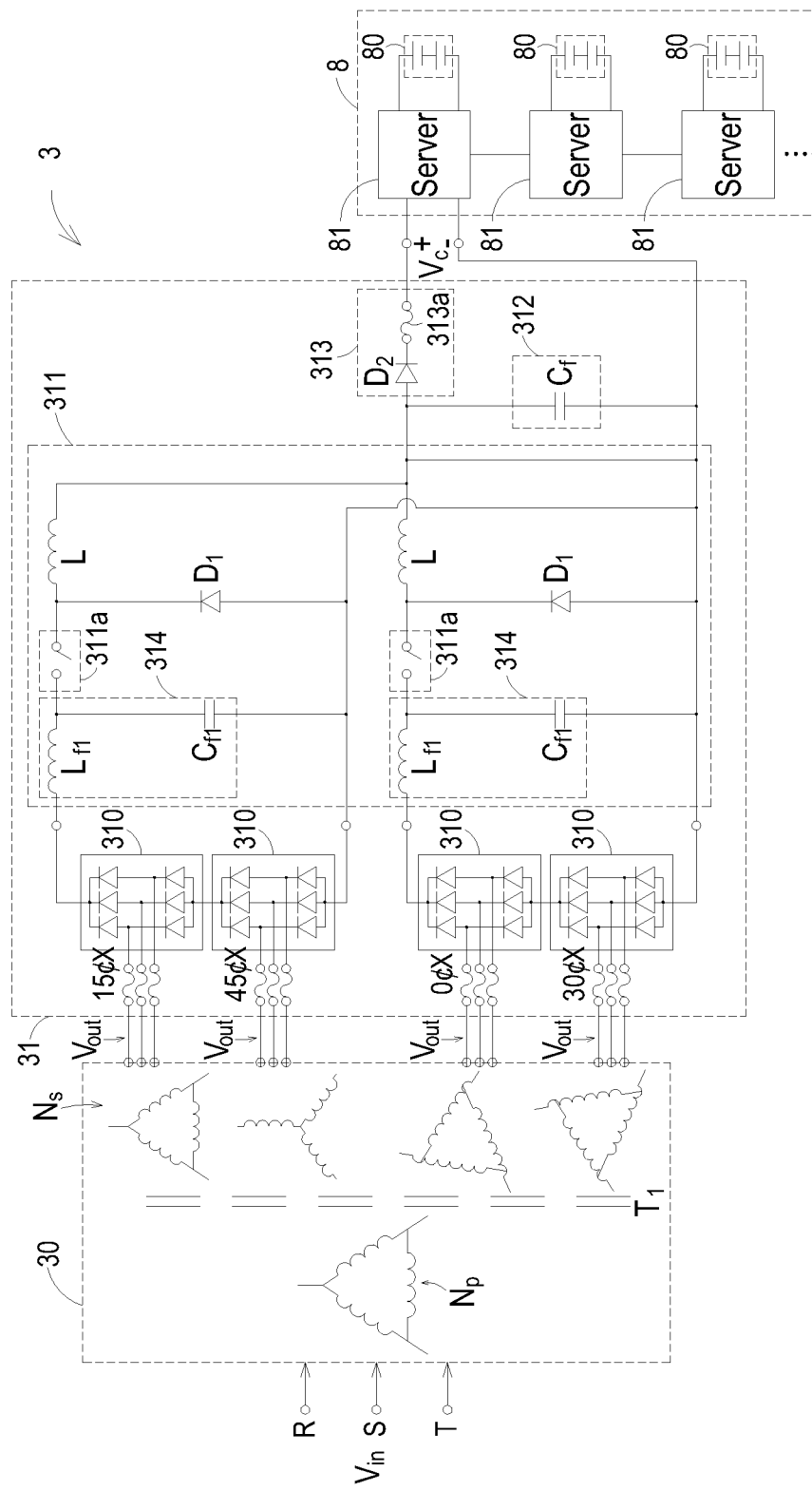
FIG. 7 schematically illustrates the charging system of FIG. 3 applied to an internet data center.

In the above embodiments, the charging system 3 is used for charging the chargeable battery 90 in the electric vehicle 9. In some embodiments, as shown in FIG. 7, the charging system 3 may be used for charging at least one chargeable battery 80 of an internet data center 8. The internet data center 8 further comprises at least one server 81. The server 81 is connected with the output terminal of the charging system 3. The chargeable battery 80 is used for providing electric energy required to power the server 81. Moreover, the DC charging voltage $V_c$ from the charging system 3 may charge the chargeable battery 80 through the server 81. As shown in FIG. 7, the chargeable battery 80 and the server 81 are separately disposed within the internet data center 8. Alternatively, the chargeable battery 80 may be directly installed in the server 81.

Please refer to FIG. 7 again. The number of the chargeable batteries 80 is equal to the number of the servers 81. In a case that the internet data center 8 has one server 81, one chargeable battery 80 is disposed within the internet data center 8. Whereas, in a case that the internet data center 8 has plural servers 81, plural chargeable batteries 80 are disposed within the internet data center 8. Under this circumstance, the plural servers 81 are connected with the plural chargeable batteries 80 one by one. In other words, the plural chargeable batteries 80 are charged by respective chargeable batteries 80 through respective servers 81.

Figure 8:
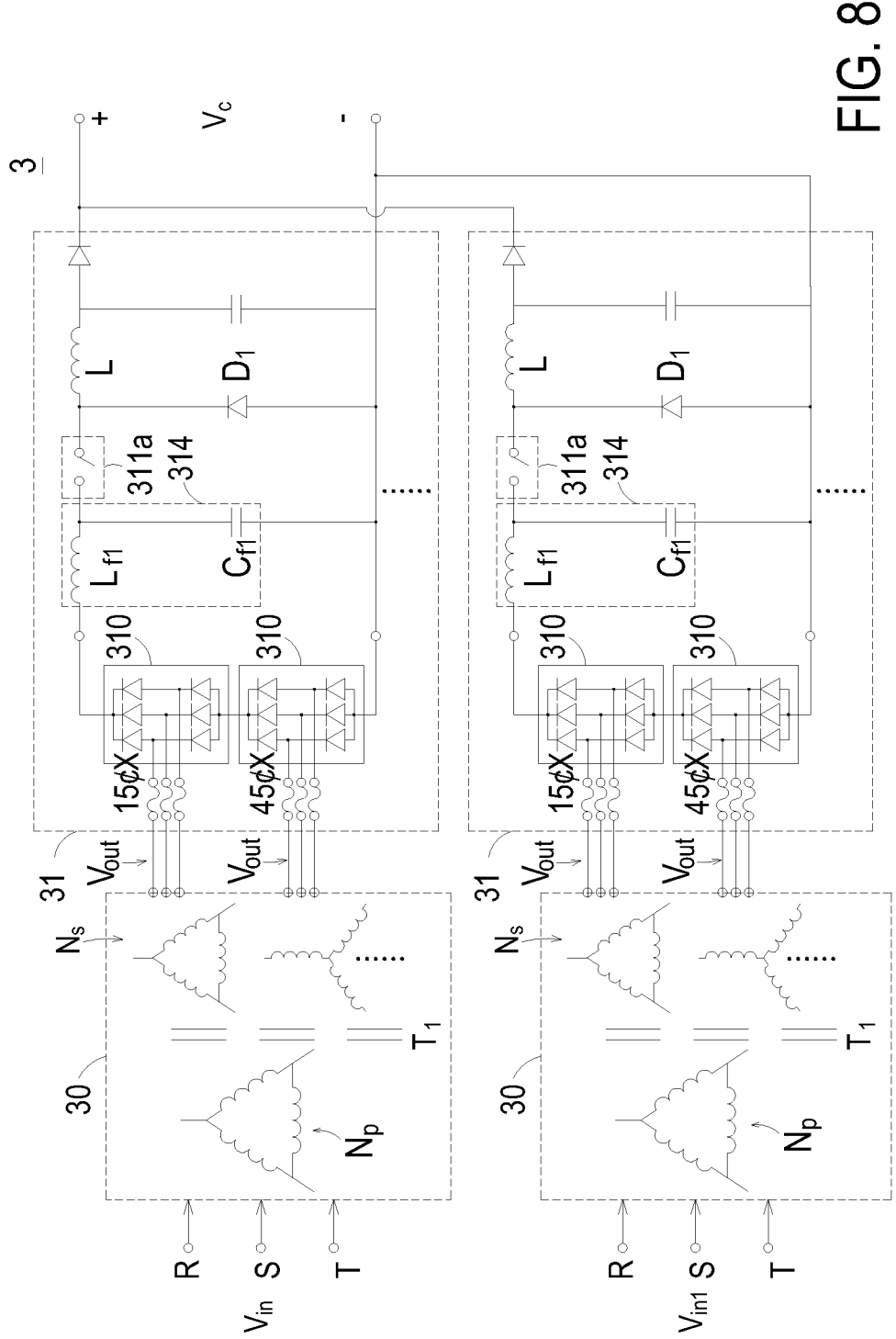
FIG. 8 schematically illustrates the architecture of another conventional charging system according to another embodiment of the present invention.

In some embodiments, the charging system also has a redundant mechanism. FIG. 8 schematically illustrates the architecture of another conventional charging system according to another embodiment of the present invention. As shown in FIG. 8, the charging system 3 comprises two isolation units 30 and two converting units 31. Each of the two isolation units 30 comprises a phase-shifting transformer $T_1$. These two phase-shifting transformers $T_1$ of two isolation units 30 are respectively used for two medium-high three-phase AC input voltages $V_{in}$ and $V_{in1}$ from two power-supplying terminals. The two power-supplying terminals are provided by an identical utility power source or two different utility power sources. The output terminal of the isolation unit 30 is connected with a corresponding converting unit 31. The output terminals of the two converting units 31 may be connected with each other in parallel. The converting unit 31 may be a single-phase or multi-phase converting unit. In this embodiment, the converting unit 31 is a multi-phase converting unit. As shown in FIG. 8, each of the converting units 31 comprises plural three-phase rectifying circuits 310 and a DC-DC converting circuit 311. The internal circuitry configurations and the operating principles of the isolation unit 30 and the converting unit 31 are similar to those of FIG. 3 or FIG. 7, and are not redundantly described herein.

Moreover, in the charging system 3 of FIG. 8, one of the isolation units 30 and the corresponding converting unit 31 are defined as a main power-supplying unit for providing the DC charging voltage $V_c$. The other isolation unit 30 and the corresponding converting unit 31 are defined as a redundant power-supplying unit. In a case that the three-phase AC input voltage $V_{in}$ is normally received by the main power-supplying unit, the three-phase AC input voltage $V_{in}$ is converted into the DC charging voltage $V_c$ by the main power-supplying unit. Meanwhile, under control of a controlling unit (not shown) within the charging system 3, the redundant power-supplying unit is disabled or in a standby state. On the other hand, if the three-phase AC input voltage $V_{in}$ received by the main power-supplying unit is abnormal or interrupted, the converting unit 31 of the main power-supplying unit is disabled under control of the controlling unit of the charging system 3. Under this circumstance, the redundant power-supplying unit is enabled to convert the three-phase AC input voltage $V_{in1}$ into the DC charging voltage $V_c$.

It is noted that numerous modifications and alterations may be made while retaining the teachings of the invention. For example, as shown in FIG. 3, the charging system 3 of FIG. 8 further comprises an output filtering circuit 312 and a protecting circuit 313, which are connected to the output terminal of the charging system 3. Similarly, as shown in FIG. 4, the charging system 3 of FIG. 8 further comprises an output filtering circuit 411b and a protecting circuit 411c, which are included in each converting unit 31.

From the above description, the isolation unit of the charging system is implemented by a phase-shifting transformer. The phase-shifting transformer is used for converting a medium-high three-phase AC input voltage into plural three-phase AC output voltages, wherein there is a phase-shifting angle between any two three-phase AC output voltages. Since no power factor correction circuit is included in the charging system of the present invention, the harmonic wave number and the harmonic wave component are reduced, and the power factor is increased. In such way, the charging system of the present invention has reduced fabricating cost and enhanced conversion efficiency.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A charging system for charging a chargeable battery, said charging system comprising:
    a phase-shifting transformer comprising a three-phase primary winding assembly and plural three-phase secondary winding assemblies, wherein after a three-phase AC input voltage is received by said three-phase primary winding assembly, said three-phase AC input voltage is decreased into plural three-phase AC output voltages, and said plural three-phase AC output voltages are outputted from respective three-phase secondary winding assemblies, wherein there is a phase-shifting angle between any two of said plural three-phase AC output voltages; and
    a converting unit electrically connected with said phase-shifting transformer, and comprising plural three-phase rectifying circuits and a DC-DC converting circuit, wherein said plural three-phase AC output voltages are rectified by said three-phase rectifying circuits, and said rectified voltage is converted into a DC charging voltage to charge said chargeable battery;
    wherein said three-phase AC input voltage has a medium-high voltage level in a range between 1.2 KV and 22 KV.

2. The charging system according to claim 1, wherein said chargeable battery is installed in an electric vehicle, said phase-shifting transformer is installed in a charging station, and said converting unit is installed in said charging station.

3. The charging system according to claim 1, wherein said phase-shifting transformer complies with a medium-high voltage wiring safety regulation.

4. The charging system according to claim 1, wherein each of said plural three-phase secondary winding assemblies has at least one tapped winding structure.

5. The charging system according to claim 1, wherein said phase-shifting transformer is a 12-pulse or higher-pulse phase-shifting transformer.

6. The charging system according to claim 1, wherein said converting unit further comprises an output filtering circuit, wherein said output filtering circuit is electrically connected with an output terminal of said DC-DC converting circuit for filtering said DC charging voltage.

7. The charging system according to claim 1, wherein said converting unit further comprises a protecting circuit, wherein said protecting circuit is electrically connected with an output terminal of said DC-DC converting circuit for preventing a voltage of said chargeable battery from being returned back to said charging system.

8. The charging system according to claim 7, wherein said protecting circuit comprises a diode and a fuse.

9. The charging system according to claim 1, wherein said DC-DC converting circuit is a multi-phase DC-DC converting circuit.

10. The charging system according to claim 9, wherein said DC-DC converting circuit comprises a first-phase DC-DC converting circuit and a second-phase DC-DC converting circuit, which are connected with each other in parallel, wherein each of said first-phase DC-DC converting circuit and said second-phase DC-DC converting circuit has a non-isolated buck-type circuitry configuration, or each of said first-phase DC-DC converting circuit and said second-phase DC-DC converting circuit has a non-isolated boost-type circuitry configuration, or each of said first-phase DC-DC converting circuit and said second-phase DC-DC converting circuit has an isolated full-bridge circuitry configuration, or each of said first-phase DC-DC converting circuit and said second-phase DC-DC converting circuit has an isolated resonant circuitry configuration.

11. The charging system according to claim 1, wherein said chargeable battery is installed in an internet data center with at least one sever, wherein said server is electrically connected with said charging system and said chargeable battery, and said chargeable battery is charged by said DC charging voltage through said server.

* * * * *